United States Patent
Olmsted et al.

(10) Patent No.: US 8,181,848 B2
(45) Date of Patent: May 22, 2012

(54) METHODS AND APPARATUS FOR METERING PRINTED MEDIA

(75) Inventors: Wayne Asa Olmsted, Trinity, FL (US); Charles Clinton Conklin, New Port Richey, FL (US); Michael Alan Hicks, Clearwater, FL (US); Robert A. Luff, New York, NY (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 737 days.

(21) Appl. No.: 12/064,565

(22) PCT Filed: Sep. 1, 2006

(86) PCT No.: PCT/US2006/034057
§ 371 (c)(1),
(2), (4) Date: Jul. 2, 2008

(87) PCT Pub. No.: WO2007/027912
PCT Pub. Date: Mar. 8, 2007

(65) Prior Publication Data
US 2009/0201132 A1    Aug. 13, 2009

Related U.S. Application Data

(60) Provisional application No. 60/714,055, filed on Sep. 2, 2005.

(51) Int. Cl.
*G06F 17/00* (2006.01)
(52) U.S. Cl. .................. 235/375; 235/492; 705/7.29
(58) Field of Classification Search ............. 235/375, 235/492; 705/7.29
See application file for complete search history.

(56) References Cited

U.S. PATENT DOCUMENTS

| | | |
|---|---|---|
| 4,659,314 A | 4/1987 | Weinblatt |
| 4,726,771 A | 2/1988 | Weinblatt |
| 4,930,011 A | 5/1990 | Kiewit |
| 4,939,326 A | 7/1990 | Weinblatt |
| 5,019,679 A | 5/1991 | Weinblatt |
| 5,031,027 A | 7/1991 | Dorinski et al. |

(Continued)

FOREIGN PATENT DOCUMENTS

EP        0769749        4/1997

(Continued)

OTHER PUBLICATIONS

International Search Report and Written Opinion, mailed on Mar. 6, 2007, in corresponding PCT Application No. PCT/US06/34057, 9 pages.

(Continued)

*Primary Examiner* — Allyson Trail
(74) *Attorney, Agent, or Firm* — Hanley, Flight & Zimmerman, LLC

(57) ABSTRACT

Methods and apparatus for metering printed media are disclosed. A disclosed example apparatus comprises a first radio frequency identification (RFID) tag to adhere to a first leaflet of a printed media at a first location; a second RFID tag to adhere to a second leaflet of the printed media at a second location of the second leaflet, the first and second locations being substantially a same location; and a first RFID absorber to adhere to a third leaflet of the printed media such that, when the printed media is positioned to expose the first and the third leaflets, the second RFID tag is inactive, and such that, when the printed media is positioned to expose the second and the third leaflets, the first RFID tag is inactive.

79 Claims, 10 Drawing Sheets

U.S. PATENT DOCUMENTS

| | | | |
|---|---|---|---|
| 5,234,345 | A | 8/1993 | Weinblatt |
| 5,515,270 | A | 5/1996 | Weinblatt |
| 5,874,724 | A | 2/1999 | Cato |
| 6,176,425 | B1 | 1/2001 | Harrison et al. |
| 6,970,131 | B2 | 11/2005 | Percy et al. |
| 7,038,619 | B2 | 5/2006 | Percy et al. |
| 7,171,331 | B2 | 1/2007 | Vock et al. |
| 7,272,982 | B2 | 9/2007 | Neuhauser et al. |
| 7,408,460 | B2 | 8/2008 | Crystal et al. |
| 7,443,292 | B2 | 10/2008 | Jensen et al. |
| 7,650,793 | B2 | 1/2010 | Jensen et al. |
| 2002/0138347 | A1 | 9/2002 | Sakata |
| 2002/0169666 | A1 | 11/2002 | Ike et al. |
| 2003/0171984 | A1 | 9/2003 | Wodka et al. |
| 2004/0044576 | A1 | 3/2004 | Kurihara et al. |
| 2004/0054627 | A1 | 3/2004 | Rutledge |
| 2005/0006466 | A1 | 1/2005 | Overhultz et al. |
| 2005/0234774 | A1 | 10/2005 | Dupree |
| 2005/0268789 | A1 | 12/2005 | Mazzer |
| 2005/0268798 | A1 | 12/2005 | Neuhauser et al. |
| 2006/0087434 | A1* | 4/2006 | Kashiwase .................. 340/572.1 |
| 2006/0136292 | A1 | 6/2006 | Bhati et al. |
| 2007/0038516 | A1 | 2/2007 | Apple et al. |
| 2007/0164866 | A1 | 7/2007 | Robin et al. |
| 2007/0288277 | A1 | 12/2007 | Neuhauser et al. |
| 2007/0288476 | A1 | 12/2007 | Flanagan, III et al. |
| 2008/0086304 | A1 | 4/2008 | Neuhauser |
| 2008/0091087 | A1 | 4/2008 | Neuhauser et al. |
| 2009/0190741 | A1* | 7/2009 | O'Connor ................ 379/265.09 |
| 2009/0248640 | A1* | 10/2009 | Porat ................................. 707/3 |
| 2010/0019482 | A1* | 1/2010 | Kumagai et al. ................ 283/72 |
| 2010/0206949 | A1* | 8/2010 | Mattlin et al. ................ 235/375 |

FOREIGN PATENT DOCUMENTS

| | | |
|---|---|---|
| FR | 2863748 | 6/2005 |
| JP | 11348471 | 12/1999 |
| JP | 2000187715 | 7/2000 |
| JP | 2003094858 | 4/2003 |
| JP | 2003317047 | 11/2003 |
| JP | 2005086308 | 3/2005 |
| JP | 2005096164 | 4/2005 |
| WO | 2007027912 | 3/2007 |

OTHER PUBLICATIONS

International Preliminary Report on Patentability, mailed on Apr. 4, 2008, in corresponding PCT Application No. PCT/US06/34057, 4 pages.

International Preliminary Report on Patentability, dated Mar. 14, 2008, in corresponding PCT Application No. PCT/US06/34057, 13 pages.

Want, Roy et al, "Bridging Physical and Virtual Worlds with Electronic Tags", CHI'99, Apr. 1999, pp. 1-8, ACM Press, USA.

European Patent Office, Extended European Search Report issued in connection with European Patent Application No. 06802728.3, dated Jul. 21, 2009, 9 pages.

The State Intellectual Property Office of China, First Notification of Office action, including Office action and its English translation, issued in connection with Chinese Patent Application Serial No. 200680037342.4, issued Sep. 11, 2009, 12 pages.

Application and drawings as filed May 31, 2007 in U.S. Appl. No. 60/941,224, 23 pages.

European Patent Office, Examination Report issued in connection with European Patent Application No. 06802728.3, dated Sep. 25, 2009, 1 page.

Australian Intellectual Property Office, "Examiner's First Report," issued in connection with Australian Patent Application Serial No. 2006284718, on Sep. 9, 2009 (2 pages).

Canadian Office Action, issued by the Canadian Intellectual Property Office in connection with Canadian application No. 2,621,061, on Dec. 9, 2011, 3 pages.

English Abstract of JP2000187715, retrieved from the Internet on Apr. 16, 2011, 1 page.

English Abstract of 2003094858, retrieved from the Internet on Apr. 16, 2011, 1 page.

English Abstract of JP2003317047, retrieved from the Internet on Apr. 16, 2011, 1 page.

English Abstract of JP2005096164, retrieved from the Internet on Apr. 16, 2011, 1 page.

English language Japanese Office Action, issued by the Japanese Patent Office in connection with Japanese application No. 2008-529280, on Mar. 1, 2011, 4 pages.

Japanese Office Action, issued by the Japanese Patent Office in connection with Japanese application No. 2008-529280, on Mar. 1, 2011, 3 pages.

English language Chinese Office Action, issued by the State Intellectual Property Office of China in connection with Chinese application No. 200680037342.4, on Nov. 23, 2010, 6 pages.

Chinese Office Action, issued by the State Intellectual Property Office of China in connection with Chinese application No. 200680037342.4, on Nov. 23, 2010, 4 pages.

* cited by examiner

| 505 | 510 | 515 |
|---|---|---|
| RFID UNIQUE ID CODE 100 | TIME-OF-DAY 100 | DATE 100 |
| RFID UNIQUE ID CODE 101 | TIME-OF-DAY 101 | DATE 101 |
| RFID UNIQUE ID CODE 102 | TIME-OF-DAY 102 | DATE 102 |
| RFID UNIQUE ID CODE 103 | TIME-OF-DAY 103 | DATE 103 |

| 520 | 525 | 530 |
|---|---|---|
| PAGE NUMBER 100 | TIME-OF-DAY 100 | DATE 100 |
| PAGE NUMBER 101 | TIME-OF-DAY 101 | DATE 101 |
| PAGE NUMBER 102 | TIME-OF-DAY 102 | DATE 102 |
| PAGE NUMBER 103 | TIME-OF-DAY 103 | DATE 103 |

| LEAFLET 40 | TAG ZONE 910A |
| --- | --- |
| LEAFLET 41 | ABSORBER ZONE 910A |
| LEAFLET 42 | TAG ZONE 910A<br>TAG ZONE 910B |
| LEAFLET 43 | ABSORBER ZONE 910B |

| LEAFLET 31 | TAG ZONE 910C |
| --- | --- |
| LEAFLET 32 | ABSORBER ZONE 910C |
| LEAFLET 53 | TAG ZONE 910A |

…

METHODS AND APPARATUS FOR METERING PRINTED MEDIA

RELATED APPLICATION

This patent claims priority from U.S. Provisional Application Ser. No. 60/714,055, entitled "Methods and Apparatus for Metering Printed Media" and filed on Sep. 2, 2005, which is hereby incorporated by reference in its entirety.

FIELD OF THE DISCLOSURE

This disclosure relates generally to printed media, and, more particularly, to methods and apparatus for metering printed media.

BACKGROUND

Advertisers and/or publishers are interested in measuring and/or statistically analyzing the viewing and/or exposure of portions of printed media to demographic groups. For example, advertisers are interested in verifying overall effectiveness, reach and/or audience demographics for particular advertisements. Likewise, publishers are interested in being able to demonstrate the effectiveness, reach and/or audience demographics of advertisements viewed via their publications in order to, for example, establish an appropriate advertisement publication rate. However, relying on overall subscription and/or purchase information does not provide consumption information and/or statistics for particular and/or individual advertisements.

DETAILED DESCRIPTION

Methods and apparatus for metering printed media are disclosed. A disclosed example apparatus includes a first radio frequency identification (RFID) tag to adhere to a first leaflet of a printed media at a first location; a second RFID tag to adhere to a second leaflet of the printed media at a second location of the second leaflet, the first and second locations being substantially a same location; and a first RFID absorber to adhere to a third leaflet of the printed media such that, when the printed media is positioned to expose the first and the third leaflets, the second RFID tag is inactive, and such that, when the printed media is positioned to expose the second and the third leaflets, the first RFID tag is inactive.

Another disclosed example apparatus includes a tag to affix to a first leaflet of a printed media, and a monitoring device to place within the printed media, the media device communicatively coupled to the tag.

Yet another disclosed example apparatus for use with a printed media includes an optical sensor to record viewing of a page of the printed media, and a mechanical fastener to removeably secure the optical sensor to the printed media.

A disclosed example method includes positioning a first radio frequency identification (RFID) tag on a first leaflet of the printed media, the first RFID tag positioned at a first location on the first leaflet; positioning a second RFID tag on a second leaflet of the printed media, the second RFID tag being positioned at a second location on the second leaflet, the first and the second positions being substantially the same location; and positioning a first RFID absorber on a third leaflet of the printed media, the first RFID absorber positioned on the third leaflet at a third location such that when the printed media is opened to expose the first and the third leaflets, the second RFID tag is inactive, and such that when the printed media is opened to expose the second and the third leaflets, the first RFID tag is inactive.

Another disclosed example method includes adhering a tag to a first leaflet of the printed media, and placing a removable monitoring device within the printed media to communicate with the tag.

Yet another disclosed example method includes capturing an image of an edge of the printed media, and identifying a viewed page based on the image.

Figure 1:
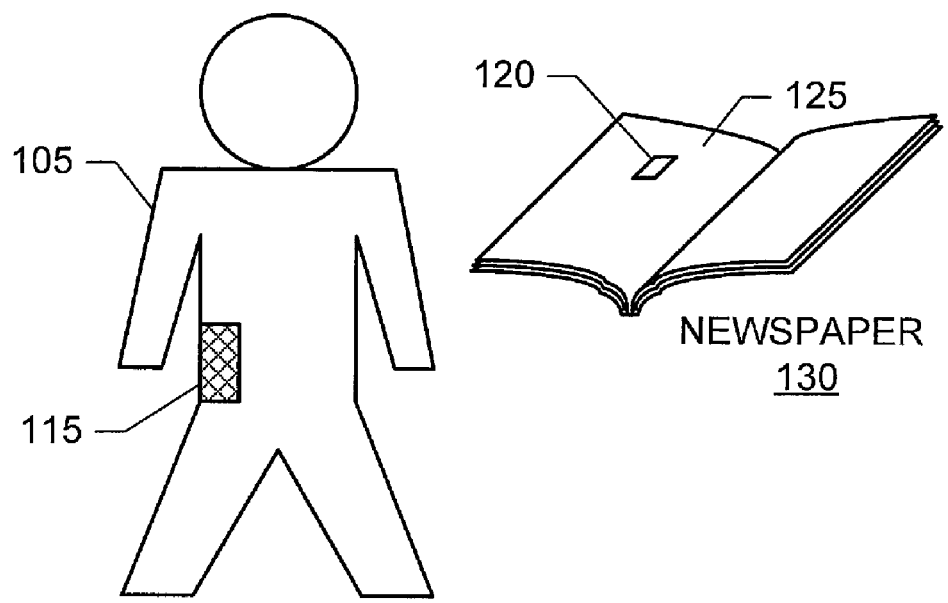
FIGS. 1, 2 and 3 are schematic illustrations of example systems constructed in accordance with the teachings of the invention for metering printed media.

FIG. 1 illustrates an example system constructed in accordance with the teachings of the invention for metering printed media (e.g., a magazine, a book, a journal, a newspaper, a newsletter, a pamphlet, a flyer, etc.). In the example system of FIG. 1, a person 105 (e.g., a respondent, a panelist, a participant, etc.) carries (or wears) a small battery powered monitoring device 115. The monitoring device 115 periodically or aperiodically attempts to communicate with a radio frequency identification (RFID) tag 120 that is affixed to, adhered to or embedded within, for example, a page 125 of the monitored media (e.g., a newspaper 130). In the illustrated example, the RFID tag 120 can only operate and communicate with the monitoring device 115 when the RFID tag 120 is exposed to light. Thus, the monitoring device 115 can only communicate with the RFID tag 120 when the page 125 of the printed media 130 that the RFID tag 120 is affixed to is open for viewing such that the RFID tag 120 is exposed to light and, thus, operational.

The example light sensitive RFID tag 120 may be implemented by a thin flat package having a printable top surface, an adhesive bottom surface and comprising any of a variety of RFID microchips with a memory and an antenna coil and any of a variety of light sensing circuits or devices. Alternatively, the light sensitive RFID tag 120 may be implemented by placing any of a variety of RFID microchips and any of a variety of light sensing circuits or devices onto a leaflet, or adhering them to the leaflet, and covering them with a paper label. A RFID microchip listens for a radio frequency (RF) signal sent by a monitoring device 115. When the RFID microchip receives a query, it responds by transmitting at least a unique identification (ID) code back to the monitoring device 115. The example light sensitive RFID tag 120 is passive and does not require a battery as it is powered by the RF signal transmitted by the monitoring device 115 to query the tag 120. Using any of a variety of techniques, the light sensing circuit or device disables operation of the RFID microchip when the light sensitive RFID tag 120 is not exposed to light. Due to the thinness and printability of the example light sensitive RFID tag 120, when adhered to a page of a printed media the tag 120 blends in with the printed media page it is adhered to and, thus, is essentially imperceptible to the respondent 105. Alternatively, the example RFID tag 120 may be active (i.e., it contains a power source (e.g., battery) and, thus, maybe able to communicate over longer distances).

When the monitoring device 115 is able to communicate with the RFID tag 120, the monitoring device 115 logs the time, date, and the unique ID code of the RFID tag 120. If the newspaper 130 has a plurality of light sensitive RFID tags (each having a unique ID code) affixed to, adhered to or embedded within respective ones of a plurality of pages of the newspaper 130, then the monitoring device 115 can detect and log when communication with any of the plurality of light sensitive RFID tags is achieved. Thus, the monitoring device 115 can record when each RFID tagged page of the newspaper 130 is opened for viewing by the respondent 105. For example, if some, or all, of the pages of a newspaper 130 containing advertisements are each tagged with one of the plurality of light sensitive RFID tags, then the monitoring device 105 can record data representative of exposure of the respondent 105 to the thus metered advertisements by logging the RFID tags of the pages as the pages are viewed and later correlating each of the logged ID codes with its respective advertisement using a database of known ID codes associated with known advertisements.

Figure 2:
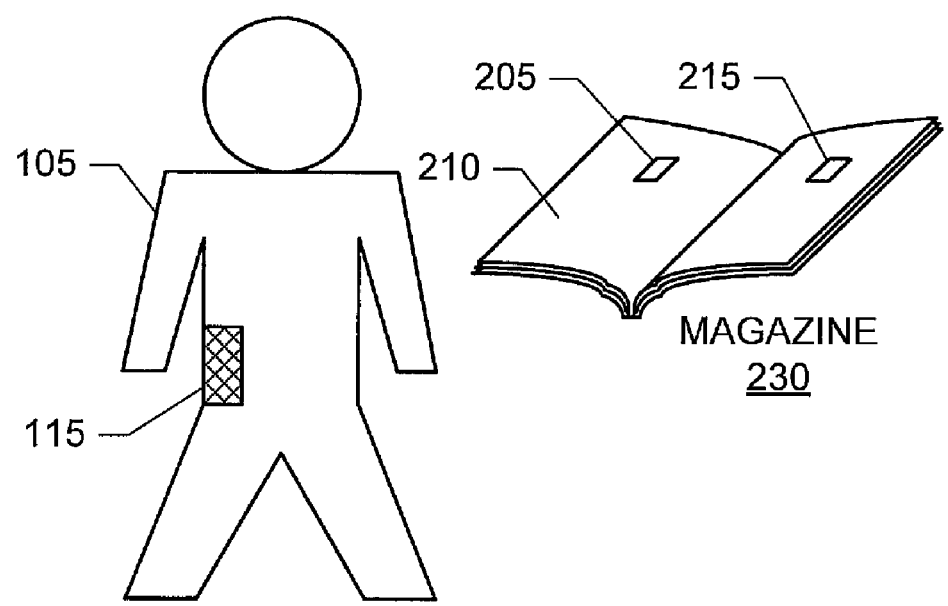

FIG. 2 illustrates another example system constructed in accordance with the teachings of the invention for metering a printed media (e.g., a magazine, a book, a journal, a newspaper, a newsletter, a pamphlet, a flyer, etc.). In the example system of FIG. 2, the monitoring device 115 periodically or aperiodically attempts to communicate with a RFID tag 205 that is affixed to, adhered to or embedded within, for example, a leaflet 210 (i.e., one of a plurality of distinct pieces of paper possibly printed on both sides and combined together to form a printed media) of a magazine 230. In the illustrated example, the RFID tag 205 can only communicate with the monitoring device 115 when the RFID tag 205 is not in proximity to a RFID absorber 215 that is affixed to, adhered to or embedded within a leaflet adjacent to the leaflet 210. Example RFID absorbers 215 include a paper label having a bottom side that is printed with a conductive ink or laminated with a metal foil and that is adhered to a leaflet with the bottom side facing towards the leaflet. Alternatively, the RFID absorber 215 may be implemented as a paper label covering conductive ink printed onto the leaflet and/or a metal foil adhered to the leaflet. When an absorber 215 is in proximity to a RFID tag it inhibits the RFID tag from communicating with the monitoring device 115 by interfering, distorting, etc., RF signal transmissions. Due to the thinness of the example RFID absorber 215 and the printability of the top side of the example RFID absorber 215, when adhered to a page of a printed media the absorber 215 blends in with the printed media page it is adhered to and, thus, is substantially imperceptible to the respondent 105. The conductive ink or metal foil inhibits the ability of a proximate RFID tag to communicate with the monitoring device 115. Thus, the monitoring device 115 can only communicate with the RFID tag 205 when the magazine 230 is open for viewing such that the RFID tag 205 and the RFID absorber 215 are on facing pages (i.e., each on a page currently open for viewing) as illustrated in FIG. 2.

In some examples, an RFID tag may be positioned relative to the RFID tag 205 such that the RFID tag operates as an RFID absorber 215 and inhibits operation of the RFID tag 205, and/or vice versa. For instance, the RFID tags may be adhered to leaflets such when the printed media is in at least one position (i.e., opened to view two facing pages), that their antennas are positioned to cause mutual signal interference (e.g., the antennas are aligned, rotated, and/or offset). Additionally or alternatively, an RFID tag 205 may include conductive ink and/or a metal foil such that it can inhibit operation of a nearby RFID tag. In such example, RFID tags may operate as RFID tags and RFID absorbers.

The example RFID tag 205 may be implemented similarly to the RFID tag 120. Thus, the RFID tag 205 may be implemented by a thin flat package having a printable top surface, an adhesive bottom surface and comprising any of a variety of RFID microchips. Alternatively, the RFID tag 205 may be implemented by placing any of a variety of RFID microchips onto a leaflet, or adhering them to the leaflet, and covering them with a paper label. The example RFID tag 205 is passive and does not require a battery as it is powered by the RF signal transmitted by the monitoring device 115 to query the tag 205. Due to the thinness and printability of the example RFID tag 205, when adhered to a page of a printed media, the tag 205 substantially blends in with the printed media page it is adhered to and, thus, may be substantially imperceptible to the respondent 105. Alternatively, the example RFID tag 205 may be active (i.e., it contains a power source (e.g., battery) and, thus, may be able to communicate over longer distances).

When the monitoring device 115 is able to communicate with the RFID tag 205, the monitoring device 115 of the illustrated example logs the time, date, and the unique ID code of the RFID tag 205. If the magazine 230 has a plurality of RFID tags (each having a unique ID code) and a plurality of RFID absorbers affixed to, adhered to or embedded within respective ones of a plurality of leaflets of the magazine 230 in patterns such as those described in connection with FIGS. 8A-C, 9 and 10A-B, then the monitoring device 115 can detect and log when communication with any of the plurality of RFID tags is achieved. Thus, the monitoring device 115 can record when facing pages of the magazine 230 are likely being viewed by the respondent 105. For example, if some, or all, of the pages of the magazine 230 containing advertisements are tagged with one of the plurality of RFID tags or RFID absorbers, then the monitoring device 105 can record data representative of exposure of the respondent 105 to the thus metered advertisements by logging the RFID tags of the pages as the pages are viewed and later correlating each of the logged ID codes with its respective advertisement using a database of known ID codes associated with known advertisements.

In the illustrated examples of FIGS. 1 and 2, the example monitoring device 115 is a portable device carried or worn by the respondent 105. It will be readily apparent that the monitoring device 115 could be fixed, for example, sitting on a table top, nightstand, desk, etc., hung on a vertical surface, etc. Further, while the example monitoring device 115 of FIGS. 1 and 2 is associated with the respondent 105 (i.e., viewing of a printed media is matched with the respondent 105 assigned to carry the example monitoring device 115), it will be apparent that an example monitoring device 115 could instead be shared by multiple respondents. For instance, a monitoring device 115 could be located in a public space and/or be situated to simultaneously monitor viewing of one or more printed media by one or more respondents. In such examples, the monitoring device 115 records viewing of metered portions of the one or more printed media, but does not associate the viewing as having been performed by a specific respondent.

In some examples, the monitoring device 115 is adhered to, affixed to or embedded within a card inserted into a printed media (e.g., a card having a pre-printed mailing address, including pre-paid postage, and defined by a perforation such that the card can be torn out or removed from the printed media and mailed). In such examples, the respondent 105 reads the printed media and, when finished, removes and mails the self-addressed, postage-paid insert. When the insert is received at a processing station (not shown), it may be communicatively coupled to a computing device that downloads and processes the data recorded by the insert. As described above, the example insert interacts with and logs communications with RFID tags (e.g., a light sensitive RFID tag 120 or a RFID tag 205).

It will be readily apparent to persons of ordinary skill in the art that the monitoring device 115 and the tags 120 and/or 205 could communicate using other technologies. For example, a monitoring insert 115 could be adhered to, affixed to or embedded within a card inserted into a printed media and connected to tags adhered to, affixed to or embedded to pages of the printed media via lines and/or signal traces printed directly onto the pages using conductive ink. Using the conductive signal paths, the example monitoring insert 115 can monitor when each of the tags is exposed for viewing by any respondent. Using implementations similar to those described above, an example tag could be light-sensitive such that it communicates with the monitoring insert 115 when the light-sensitive tag is exposed to light. Alternatively or additionally, the example tag maybe disabled by a proximate disabling tag that disrupts communications between the monitoring insert 115 and the example tag. As the printed media is viewed, the monitoring insert 115 logs the unique ID code of each associated tag when each tag is able to communicate with the monitoring insert 115. When viewing of the printed, media is complete, the monitoring insert 115 may, for example, be removed from the printed media and/or be communicatively coupled to a computing device to download the log recorded by the monitoring insert 115.

Figure 3:
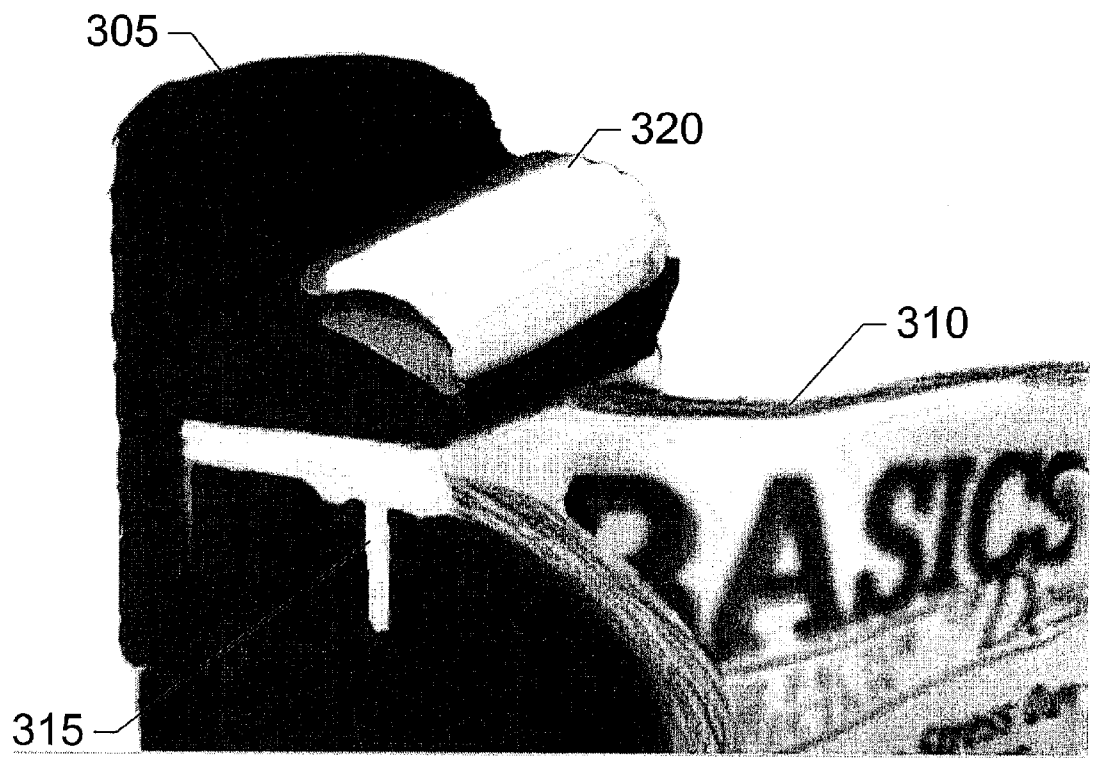

FIG. 3 illustrates yet another example system constructed in accordance with the teachings of the invention for metering a printed media (e.g., a magazine, a book, a journal, a newspaper, a newsletter, a pamphlet, a flyer, etc.). In the example system of FIG. 3, the respondent 105 removably attaches and/or secures an optical monitoring device 305, for example, at the top of the spine (i.e., binding) of a printed media 310 to be monitored (e.g., a journal 310) using, for example, a mechanical fastener such as forks and/or clips 315 located on each side of the optical monitoring device 305. The distance between the two forks/clips 315 is adjustable to accommodate a wide range of print media thicknesses. In the illustrated example of FIG. 3, the printed media to be metered may be printed/published without modification, enhancement, etc. from the standard printing/publishing processes in use today, or envisioned to be used in the future, to manufacture and distribute printed media. While the example optical monitoring device 305 of FIG. 3 is attached and/or secured at the top of the printed media 310, persons of ordinary skill in the art will readily appreciate that an optical monitoring device 305 may be attached and/or secured at other locations such as the bottom, corner and/or side of the printed media 310.

In the illustrated example of FIG. 3, the optical monitoring device 305 is battery powered and uses a light collecting lens 320 and an optical sensor (not shown) to collect ambient light reflected off of the top of the journal 310. The optical monitoring device 305 uses an output of the optical sensor to determine which facing pages of the journal 310 are open for viewing by the respondent 105 by first identifying the largest gap between two leaflets and then counting the number of leaflets located on at least one side of the gap. In the illustrated example, the respondent 105 preferably initially positions the optical monitoring device 305 such that the optical monitoring device can read and record the universal product code (UPC) located on the outside cover of the journal 310 and subsequently positions the optical monitoring device 305 such that the optical monitoring device is attached to the top of the spine of the journal to enable the device to determine page viewing. However, positioning of the example optical monitoring device 305 to read and/or record the UPC can, additionally or alternatively, occur after the optical monitoring device 305 has been used to determine page viewing. By recording facing pages viewed by the respondent 105 and correlating the same with the recorded UPC, the example system of FIG. 3 can determine exposure of the respondent 105 to specific facing pages of the journal 310 (e.g., facing pages containing advertisements) by, for example, matching (i.e., correlating) the recorded information against a database reflecting the titles of printed media and the pages containing advertising within each title (e.g., facing pages 32 and 33 of the July 2005 issue of Sports Illustrated may be associated with an advertisement from Nike in the database).

The recorded log of communications between the example monitoring device 115 and the RFID tags in FIGS. 1 and 2 and/or the pages identified and recorded by the example optical monitoring device 305 of FIG. 3 is transferred from the monitoring device 115 or the optical monitoring device 305 to a local server (not shown) on a periodic, aperiodic or real-time basis. The local server may be, for example, a respondent's personal computer (PC) and/or an extensible Markup Language (XML) data collection server as described in PCT Patent Application Serial No. PCT/US2004/000818 which is hereby incorporated by reference in its entirety. The local server, in turn, provides the transferred recorded data (e.g., log of communications, or log of identified pages) to a processing server (not shown). Any of a variety of techniques for transferring data from the monitoring device 115 and/or the optical monitoring device 305 to the local server, and transferring the data from the local server to the processing server can be used. For example, the monitoring device 115 and/or the optical monitoring device 305 can be attached to the local server using a universal serial bus (USB) connection, a serial cable, a docking station or cradle, etc. The local server may, for example, transfer (e.g., via an Internet connection, dedicated network or public switched network accessible to the local server and the processing server) the recorded data to the processing server. Alternatively, the local server may periodically or aperiodically store the recorded data on a non-volatile storage medium (e.g., recordable compact disc (CD-R)) that can be transported (e.g., picked up, mailed, etc.) to a processing service and then loaded onto the processing server.

The processing server combines the recorded data (e.g., the log of communications with RFID tags, or the log of pages identified by the example optical monitoring device 305) received from some or all of the monitoring devices associated with some or all of the respondents to develop meaningful print media exposure statistics. For instance, the processing server of the illustrated example uses the combined recorded data to determine the overall effectiveness, reach and/or audience demographics of viewed advertisements in print media by processing the collected data using statistical methods.

Figure 4:
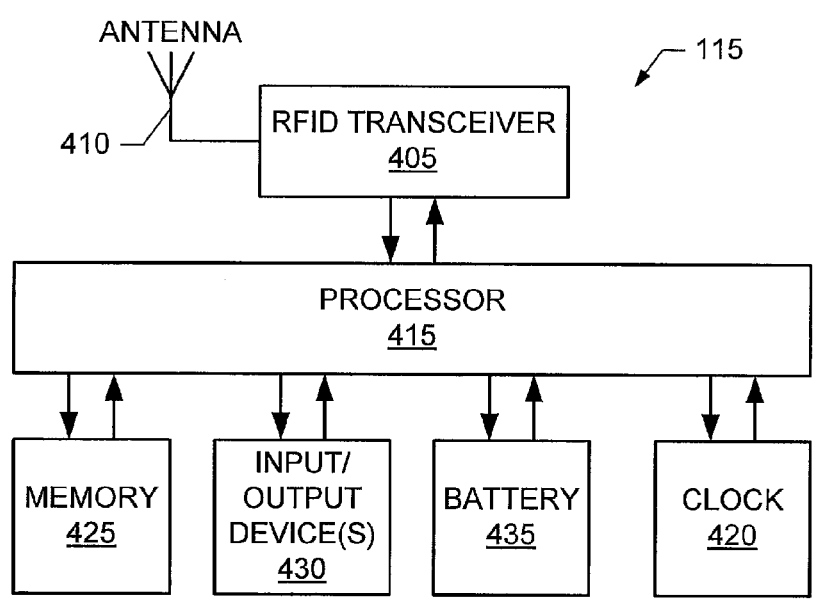
FIG. 4 is a schematic illustration of an example manner of implementing the example monitoring device of FIGS. 1 and 2.

FIG. 4 is a schematic illustration of an example manner of implementing the example monitoring device 115 of FIGS. 1 and 2. To communicate with a RFID tag (e.g., example RFID tag 205 or example light sensitive RFID tag 120), the example monitoring device 115 of FIG. 4 includes any of a variety of RFID transceiver 405 and antenna 410. The RFID transceiver 405 and the antenna 410 transmit RF signals to query any nearby RFID tags and to receive one or more RF signals transmitted by any nearby RFID tag (e.g., a unique ID code).

To initiate and process the results of RFID queries, the example monitoring device 115 of FIG. 4 includes a low power-consumption processor 415. The processor 415 can be any of a variety of general and/or customized computing devices (e.g., the processor 1610 of FIG. 16). To access time-of-day and date information, the example monitoring device 115 of FIG. 4 includes a real-time clock device 420. In the illustrated example, when the processor 415 receives a unique ID code via the RFID transceiver 405 from a nearby RFID tag (e.g., example RFID tag 205 or example light sensitive RFID tag 120), the processor 415 acquires the current time-of-day and date from the clock 420 and creates a new log entry in a memory 425. An example log illustrated in FIG. 5 A is a simple running list of log entries, each containing, among other things a unique ID code 505, a time-of-day 510 and a date 515. Other things that may be included in the log include, for example, UPC, class code (magazine, newspaper, book, journal, pamphlet, flyer, etc.), title (Time, People, Newsweek, etc.), volume number, publication date, etc.

Returning to FIG. 4, the memory 425 of the illustrated example is implemented using a combination of volatile memory (e.g., random access memory (RAM)) and non-volatile memory (e.g., read only memory (ROM), FLASH memory, etc.). In the example of FIG. 4, the log is recorded in non-volatile memory so that the log is preserved if the monitoring device 115 loses power, is turned-off or otherwise loses the ability to operate. To allow the respondent 105 to control the monitoring device 115 and/or to allow the monitoring device 115 to communicate with a download server, the example monitoring device 115 of FIG. 4 includes one or more input and/or output devices 430 (e.g., an on/off switch, a USB communications device and USB cable connector, light-emitting diode, liquid crystal display (LCD), etc.).

To provide power, the example monitoring device 115 of FIG. 4 includes a battery 435. In the illustrated example, the battery 435 preferably provides enough power to operate the monitoring device 115 for multiple days. In the example of FIG. 4, the battery 435 is a re-chargeable type of battery such that the monitoring device 115 may be connected to a power adapter (not shown) to charge/re-charge the battery 435. The monitoring device 105 may operate when connected to the power adapter. Alternatively, the battery 435 may be non re-chargeable. In such circumstances, the battery 435 is preferably replaceable by the respondent 105.

Figure 6:
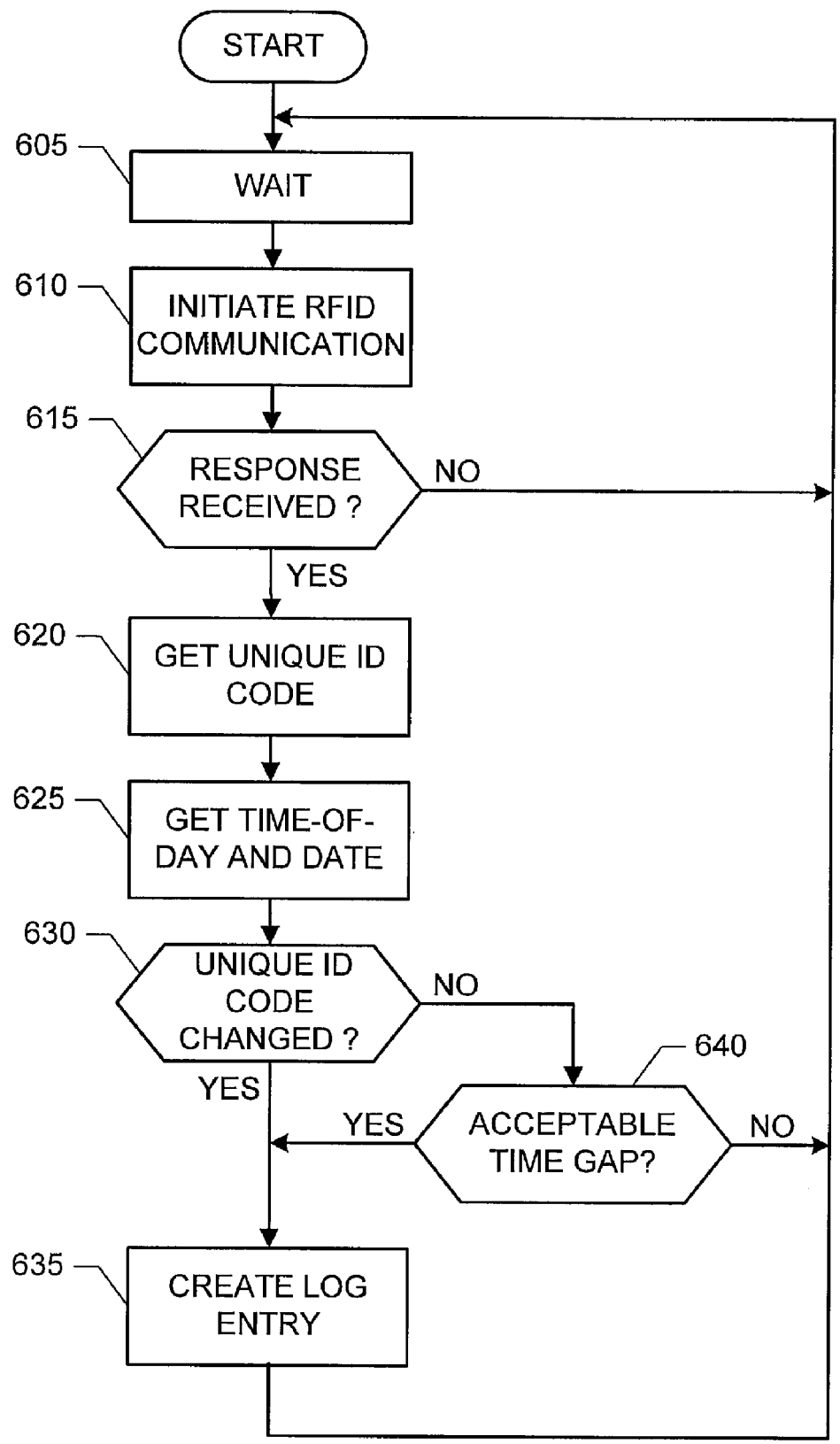
FIG. 6 is a flowchart representative of example machine readable instructions which may be executed to implement the example monitoring device of FIGS. 1 and 2.

FIG. 6 is a flowchart representative of example machine readable instructions that may be executed by a processor (e.g., the processor 415 of FIG. 4, the processor 1610 of FIG. 16, etc.) to implement the example monitoring device 115 of FIGS. 1 and 2. The machine readable instructions of FIG. 6 may be executed by a processor, a controller and/or any other suitable processing device. For example, the machine readable instructions of FIG. 6 may be embodied in coded instructions stored on a tangible medium such as a flash memory, ROM and/or RAM associated with the processor 1610 shown in the example processor platform 1600 and discussed below in conjunction with FIG. 16. Alternatively, some or all of the example machine readable instructions of FIG. 6 and/or the example monitoring device 115 of FIGS. 1 and 2 may be implemented using any of a variety of application specific integrated circuit(s) (ASIC(s)), programmable logic device(s) (PLD(s)), field programmable logic device(s) (FPLD(s)), discrete logic, hardware, etc. Also, some or all of the machine readable instructions of FIG. 6 and/or the example monitoring device 115 of FIGS. 1 and 2 may be implemented manually or as any combination of any of the foregoing techniques. Further, although the example machine readable instructions of FIG. 6 are described with reference to the flowchart of FIG. 6, persons of ordinary skill in the art will readily appreciate that many other methods of implementing the example monitoring device 115 of FIGS. 1 and 2 may be employed. For example, the order of execution of the blocks may be changed, and/or some of the blocks described may be changed, eliminated, sub-divided, or combined.

The example machine readable instructions of FIG. 6 begin when the monitoring device 115 has completed initialization, power-on functions and/or is otherwise enabled by a respondent 105. The monitoring device 115 waits for a predetermined period of time (block 605). The wait (block 605) temporally separates queries to nearby RFID tags (e.g., the example light sensitive RFID tag 120 or the example RFID tag 205) by the predetermined time period. These temporal separations serve to reduce power consumption of the monitoring device 115 and/or eliminate redundant (i.e., multiple) responses from a nearby RFID tag. The length of the predetermined time period may be experimentally determined. For example, if the separation time period is long and the respondent 105 flips pages of the metered printed media quickly, the monitoring device 115 may not accurately record each exposure of the respondent 105 to metered facing pages of the printed media. However, querying too often reduces the battery life of the monitoring device 115.

After waiting the predetermined time period (block 605), the example monitoring device 115 transmits a query (block 610) and determines if any nearby RFID tags respond (i.e., send a unique ID code in response to the query) (block 615). In the example of FIG. 6, the monitoring device 115 monitors for responses from nearby RFID tags for a predetermined period of time. For example, the monitoring device 115 allows enough time for nearby RFID tags to receive and respond to a query. Depending upon the exact implementational details of the RFID tag used to meter a printed media, the response time of the type of RFID tag used may vary. The monitoring device 115 could, for example, use a predetermined time period that accommodates RFID tags from a plurality of manufacturers or, over time, learn and adapt to a suitable time period based on responses from nearby RFID tags.

If a response from a nearby RFID tag is received (block 615), the example monitoring device 115 determines the unique ID code of the RFID tag from the received response (block 620) and determines the current time-of-day and date (block 625). Since the respondent 105 may view facing pages for a time period longer than the predetermined period of time used in block 605, the monitoring device 115 determines if the received unique ID code (block 620) has changed from the last received unique ID code (block 630). If the received unique ID code has changed (block 630), the monitoring device 115 creates and stores a new log entry containing the unique ID code, the time-of-day and the date (block 635). Control then returns to block 605 to wait the predetermined period and then query again for nearby RFID tags.

If the received unique ID code has not changed (block 630), the example monitoring device 115 determines if an acceptable time period has elapsed since the unique ID code was previously logged (block 640). If an acceptable time period has elapsed (block 640), the monitoring device 115 creates and stores a log entry containing the unique ID code, the time-of-day and the date (block 635). Control then returns to block 605 to wait the predetermined period and then query again for nearby RFID tags. If an acceptable time period has not elapsed (block 640), the monitoring device 115 returns to block 605 to wait the predetermined period and then query again for nearby RFID tags. An example acceptable elapsed time period is greater than some minimum and less than some maximum. The minimum represents a time period for which it is deemed that, for example, the respondent 105 is taking an extended time to view the current facing pages and, thus, the facing pages should be credited with a longer exposure time. The maximum represents a time period for which it is deemed that, for example, the respondent 105 has likely stopped viewing the printed media altogether and has left the printed media open. If the maximum elapsed time has occurred, the monitoring device 115 could remove previous log entries or appropriately mark the log to indicate that the respondent 105 has likely stopped viewing the printed media.

Figures 5A, 5B, 7:
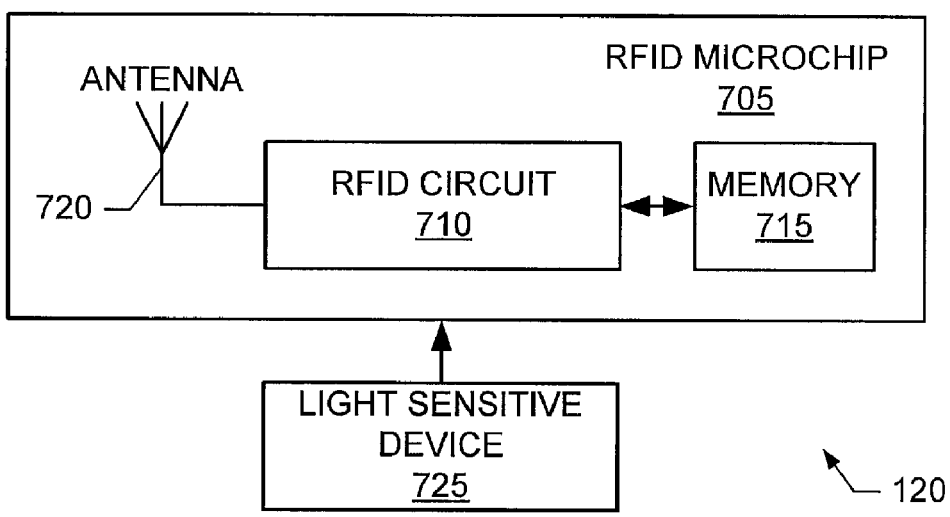
FIG. 5A is an illustration of an example log of nearby RFID tags recorded by the example monitoring device of FIGS. 1 and 2.
FIG. 5B is an illustration of an example log of page numbers recorded by the example optical monitoring device of FIG. 3
FIG. 7 is a schematic illustration of an example manner of implementing the example light sensitive RFID tag of FIG. 1.

FIG. 7 is a schematic illustration of an example manner of implementing the example light sensitive RFID tag 120 of FIG. 1. As discussed above, the example light sensitive RFID tag 120 includes any of a variety of RFID microchips 705 and any of a variety of light sensitive circuits or devices 725. As also discussed above, the RFID microchip 705 includes any of a variety of RFID circuits 710, memory 715 and antenna 720. In the example of FIG. 7, the light sensitive device 725 disables the RFID microchip 705 when the example light sensitive device 725 (i.e., the example light sensitive RFID tag 120) is not exposed to light. To this end, the example RFID microchip 705 of FIG. 7 includes an enable/disable input that allows the light sensitive device 725 to enable or disable the RFID microchip 705.

Figure 8A:
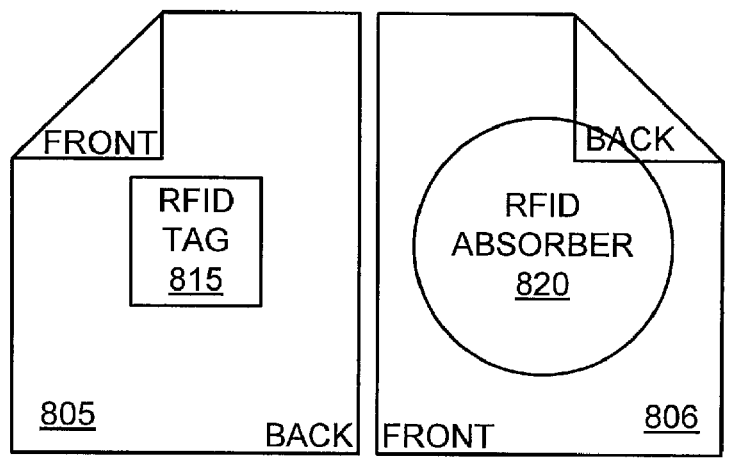
FIGS. 8A-C are illustrations of example placements of RFID tags and RFID absorbers in printed media.

FIG. 8A illustrates an example placement of a RFID tag 815 and a RFID absorber 820 in an example printed media. In particular, the RFID tag 815 is adhered to either the front or back of leaflet 805 and the RFID absorber 820 is adhered to either the front or back of the adjacent leaflet 806 in the printed media. The RFID tag 815 and the RFID absorber 820 are adhered in approximately the same location on the leaflets 805 and 806, respectively. Since, in the example illustrated in FIG. 8A the RFID tag 815 and the RFID absorber 820 are located on facing pages that are being held apart from one another (i.e., the tag 815 and the absorber 820 are separated by a distance), the RFID absorber 820 does not inhibit operation of the RFID tag 815 and, thus, the RFID tag 815 can respond to a query from a monitoring device 115.

Figure 8B:
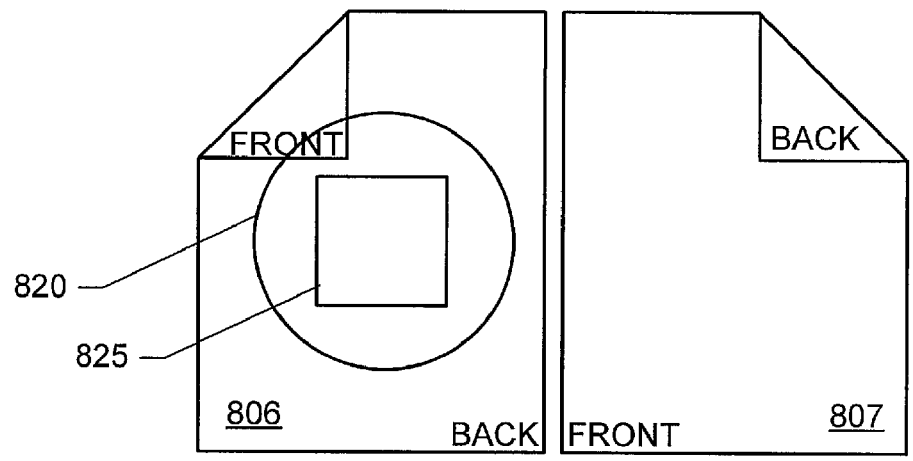

FIG. 8B illustrates the location of the RFID tag 815 and the RFID absorber 820 after a respondent 105 has turned to the next pair of facing pages in the printed media. As illustrated in FIG. 8B, the RFID tag 815 and the RFID absorber 820 are now proximate to one another such that the RFID absorber 820 inhibits operation of the RFID tag 815 and, thus, the RFID tag 815 can not respond to a query from the monitoring device 115. As such, the new facing pages are not credited with exposure to the respondent 105. It will be readily apparent to persons of ordinary skill in the art that, when the respondent 105 was viewing the pair of facing pages preceding the facing pages of FIG. 8A, the RFID tag 815 and the RFID absorber 820 also were proximate and, thus, communication between the RFID tag 815 and the monitoring device 115 was inhibited in the example of FIG. 8B.

Figure 8C:
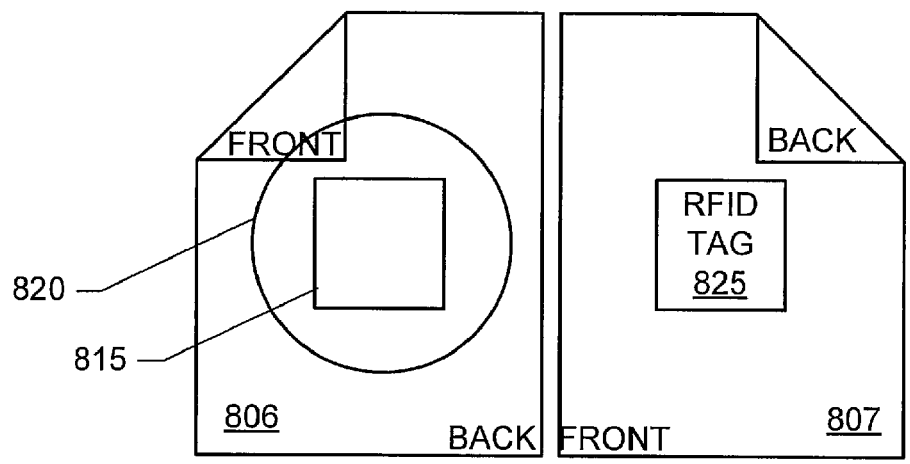

FIG. 8C illustrates the location of the RFID tag 815, the RFID absorber 820 and a second RFID tag 825 after a respondent 105 has turned to the next pair of facing pages in the printed media (identical to the pages of FIG. 8B). The second RFID tag 825 is adhered to the front or back of the leaflet 807 in approximately the same location on the leaflet 807 as the RFID absorber 820 was adhered to the leaflet 806. As in FIG. 8B, the RFID tag 815 and the RFID absorber 820 are proximate to one another such that the RFID absorber 820 inhibits operation of the RFID tag 815 and, thus, the RFID tag 815 can no longer respond to a query from the monitoring device 115. However, the RFID tag 825 is not proximate to the RFID absorber 820 and, thus, can respond to a query from the monitoring device 115 such that exposure of the respondent 105 to the new pair of facing pages is credited. As illustrated in FIG. 8C, by proper placement, a single RFID absorber may be used to inhibit the operation of two RFID tags 815 and 825.

Figures 9, 10A, 10B:
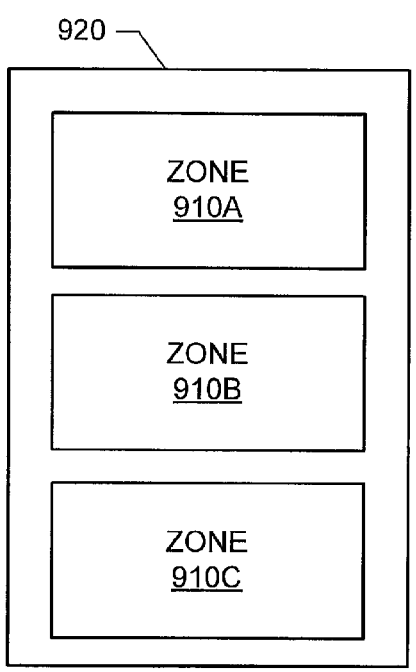
FIG. 9 is an illustration of example placement zones for RFID tags and RFID absorbers in printed media.
FIGS. 10A and 10B are illustrations of example placements of RFID tags and RFID absorbers in printed media.

Even separated by a few leaflets, an RFID absorber may inhibit operation of an RFID tag. Thus, to allow for metering of adjacent pages in a printed media, RFID tags and RFID absorbers may also be separated by placing them in different locations on the pages of the printed media. FIG. 9 illustrates example placement zones for RFID tags and RFID absorbers. The example of FIG. 9 illustrates a plurality of zones 910A, 910B and 910C each being associated with each leaflet 920 of a printed media. As described in connection with FIGS. 10A and 10B, in an example embodiment, RFID tags and RFID absorbers may be placed into the printed media using the plurality of zones 910A-C of FIG. 9.

FIG. 10A is a table containing a list of tag and absorber locations that are used to illustrate an example placement pattern based on the example placement zones of FIG. 9. In the illustrated example of FIG. 10A, leaflet 40 has a first RFID tag adhered to its front or back within zone 910A, leaflet 41 has a RFID absorber adhered to its front or back within zone 910A, leaflet 42 has a second RFID tag adhered to its front or back within zone 910A and a third RFID tag inside zone 910B, etc. Since the third RFID tag on leaflet 42 is located within zone 910B, the RFID absorber located within zone 910A on leaflet 41 does not inhibit operation of the third RFID tag on leaflet 42. Continuing in an identical or similar pattern, each and every pair of facing pages of the printed media can be properly metered for exposure to a respondent 105.

FIG. 10B is a table containing a list of tag and absorber locations that are used to illustrate another example placement pattern based on the example placement zones of FIG. 9. In the illustrated example of FIG. 10B, leaflet 31 has a first RFID tag adhered to its front or back within zone 910C, leaflet 32 has a RFID absorber adhered to its front or back within zone 910C, then leaflet 53 has a second RFID tab adhered to its front or back within zone 910A. As in FIG. 10A, the RFID absorber located within zone 910C on leaflet 32 does not inhibit the second RFID tag located within zone 910A on leaflet 53 and, thus, does not interfere with or prohibit detection of a respondent 105 viewing a facing page associated with leaflet 53. Continuing in an identical or similar pattern, other specific pairs of facing pages of the print media can be accurately metered for exposure to the respondent 105.

Figure 11:
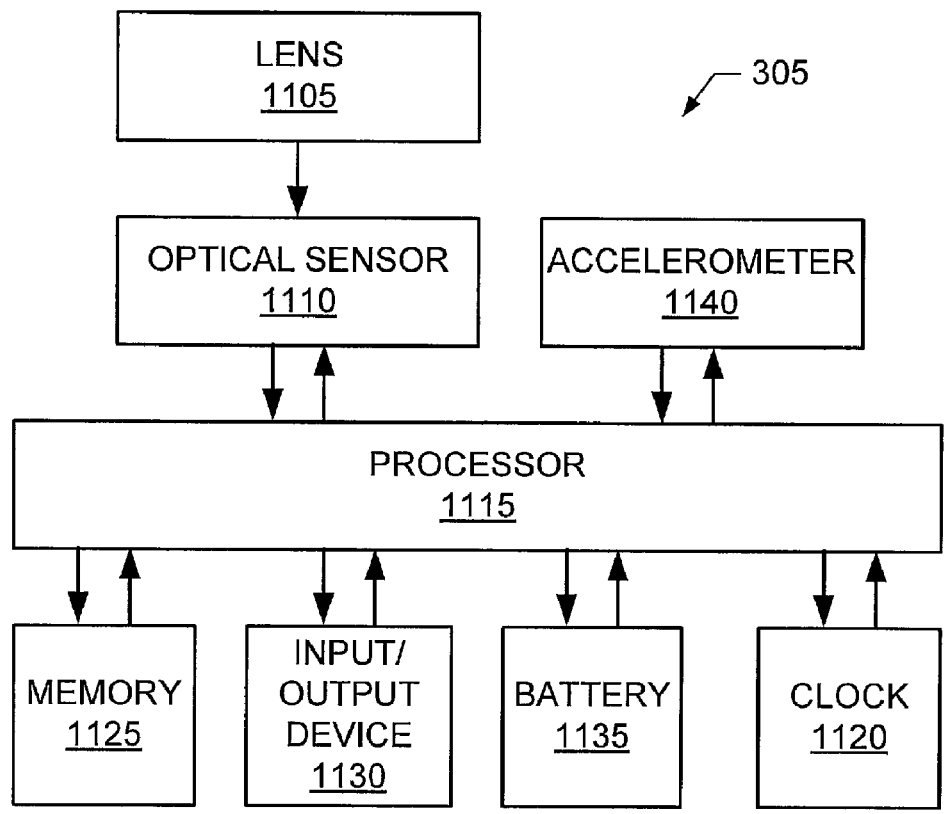
FIG. 11 is a schematic illustration of an example manner of implementing the example optical monitoring device of FIG. 3.
Figure 12:
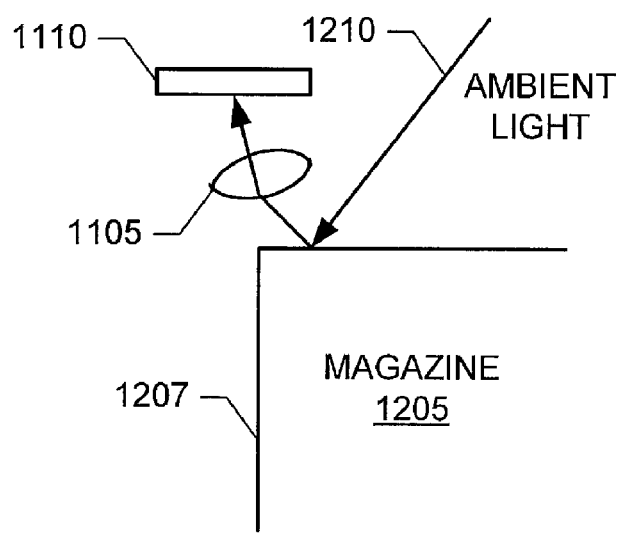
FIGS. 12 and 13 are illustrations of example operations of the example optical monitoring device of FIG. 3.

FIG. 11 is a schematic illustration of an example manner of implementing the example optical monitoring device 305 of FIG. 3. To collect ambient light reflected by the top of a printed media, the example optical monitoring device 305 of FIG. 11 includes any of a variety of optical lens 1105 and any of a variety of optical sensors 1110. As illustrated in FIG. 12, the lens 1105 focuses reflected ambient light 1210 onto the optical sensor 1110 such that a digital output of the optical sensor 1110 represents an image of the top of a printed media near the spine (e.g., a magazine 1205 having a spine 1207).

To process digital outputs of the optical sensor 1110 (i.e., images of the top of the printed media), the example optical monitoring device 305 of FIG. 11 includes a processor 1115. The processor 1115 can be any of a variety of general processors (e.g., the processor 1610 of FIG. 16) or specialized and/or customized computing devices (e.g., a digital signal processor (DSP)). To access time-of-day and date information, the example optical monitoring device 305 of FIG. 11 includes a real-time clock device 1120. In the illustrated example, when the processor 1115 receives a new image of the top of the printed media and determines that new facing pages are being viewed by a respondent 105, the processor 1115 acquires the current time-of-day and date from the clock 1120 and creates a new log entry in a memory 1125. An example log illustrated in FIG. 5B is a simple running list of log entries each containing, for example, a page number 520, a time-of-day 525 and a date 530. Other things that may be included in the log include, for example, UPC, class code (magazine, newspaper, book, pamphlet, flyer, etc), title (Time, People, Newsweek, etc.), volume number, publication date, etc.

Returning to FIG. 11, the memory 1125 of the illustrated example is implementing using a combination of volatile memory (e.g., RAM) or non-volatile memory (e.g., ROM, FLASH memory, etc.). In the example of FIG. 11, the log is recorded in non-volatile memory so that the log is preserved in the event that the optical monitoring device 305 loses power, is turned-off or otherwise loses the ability to operate. To allow the respondent 105 to control the optical monitoring device 305 and/or to allow the optical monitoring device 305 to communicate with a download server, the example optical monitoring device 305 of FIG. 11 includes one or more input and/or output devices 1130 (e.g., an on/off switch, a button that, when depressed, causes the optical monitoring device 305 to capture UPC information, a USB communications device and USB cable connector, LED, LCD, etc.).

To provide power, the example optical monitoring device 305 of FIG. 11 includes a battery 1135. In the illustrated example, the battery 1135 preferably provides enough power to operate the optical monitoring device 305 for multiple days. In the illustrated example, the battery 1135 is a rechargeable battery such that the optical monitoring device 305 may be connected to a power adapter (not shown) to charge/re-charge the battery. The optical monitoring device 305 may operate when connected to the power adapter. Alternatively, the battery 1135 may be non re-chargeable and may, thus, be replaceable by the respondent 105.

To allow the detection of motion and, thus, awaken the optical monitoring device 305 from sleep (i.e., a low-power-consumption operating state), the example optical monitoring device 305 of FIG. 11 includes an accelerometer 1140 or any other device capable of detecting motion such as, for example, a gyroscope, a pressure transducer, a compass, etc. In the illustrated example, the accelerometer 1140 detects when the optical monitoring device 305 is moved, and then sends a notification signal to the processor 1115 (e.g., an interrupt signal). Alternatively, the optical monitoring device 305 may include a watch dog timer that periodically awakens the processor 1115.

Figure 13:
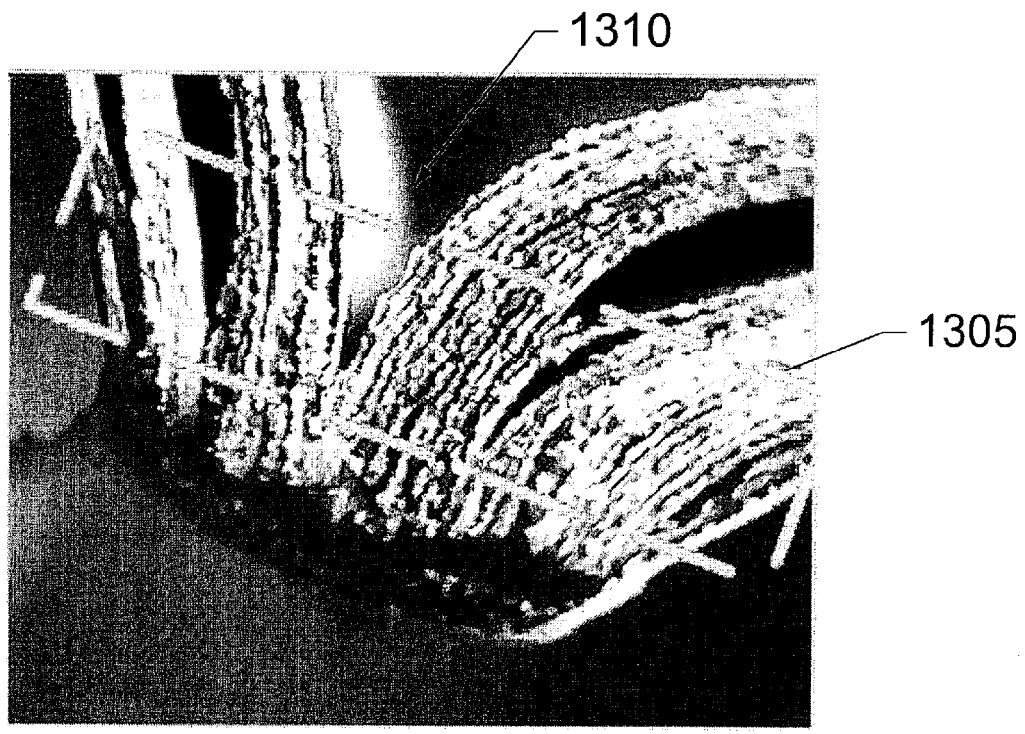

FIG. 13 illustrates an example image of the top of a printed media near the spine. The optical sensor 1110 of the example optical monitoring device 305 of FIG. 11 uses an optical sensing and/or digital recording technique to capture a portion 1305 of the example image. The portion 1305 of the example image is then provided to the processor 1115 to first determine the largest gap between two facing pages (e.g., a gap 1310), and then to count the number of pages (i.e., leaflets) on either side of the gap 1310 to determine the page number of at least one of the facing pages on either side of the gap 1310. Determining the gap and counting pages is performed using any suitable image and/or signal processing technique.

Figure 14:
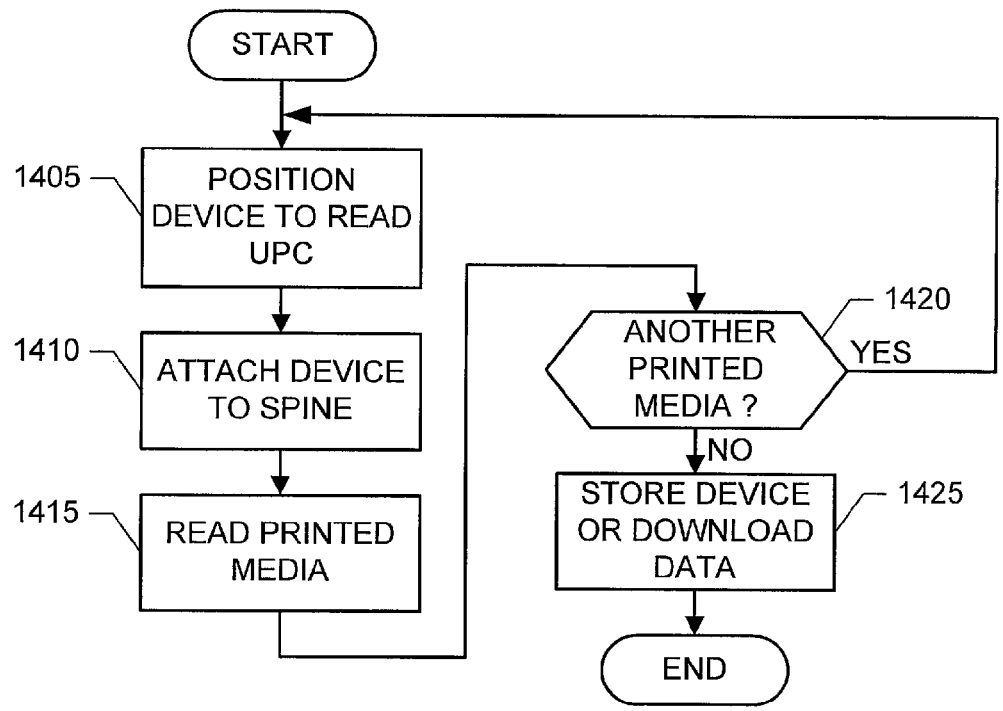
FIG. 14 is a flowchart representative of an example manner of using the optical example monitoring device of FIG. 3.

FIG. 14 is a flowchart representative of an example manner of using the example optical monitoring device 305 of FIG. 3. In the illustrated example of FIG. 3, the example process is at least partially performed by a respondent 105. Although an example manner of use is described with reference to the flowchart of FIG. 14, persons of ordinary skill in the art will readily appreciate that many other methods of using the example optical monitoring device 305 of FIG. 3 may be employed. For example, the order of execution of the blocks may be changed, and/or some of the blocks described may be changed, eliminated, sub-divided, or combined.

A respondent 105 starts the example manner of FIG. 14 by positioning and enabling the example optical monitoring device 305 of FIG. 3 so that the optical monitoring. device 305 captures the UPC of a printed media (e.g., a magazine) using the optical lens 1105 and optical sensor 1110 (block 1405). Using, for example, the forks/clips 315 discussed above, the respondent 105 next attaches the optical monitoring device 305 to the top of the spine of the magazine and enables the optical monitoring device 305 by, for example, toggling an on/off switch (block 1410). The respondent 105 then reads the magazine without further involvement with the device 305 (block 1415).

While the respondent 105 reads the magazine (block 1415), the optical monitoring device 305 records the pages of the magazine viewed by the respondent 105. If, after reading the magazine, the respondent 105 chooses to read another printed media (block 1420), the user removes the device 305 from the current printed media and places it in a similar position on the next printed media of choice (block 1405) for use in monitoring the viewing of this second printed media. If the respondent 105 does not choose to read another printed media (block 1420), the respondent 105, for example, turns off and stores the optical monitoring device 305 or initiates a procedure or connection to download data recorded by the optical monitoring device 305 to a download server (block 1425). The example usage manner of FIG. 14 then ends.

Figure 15:
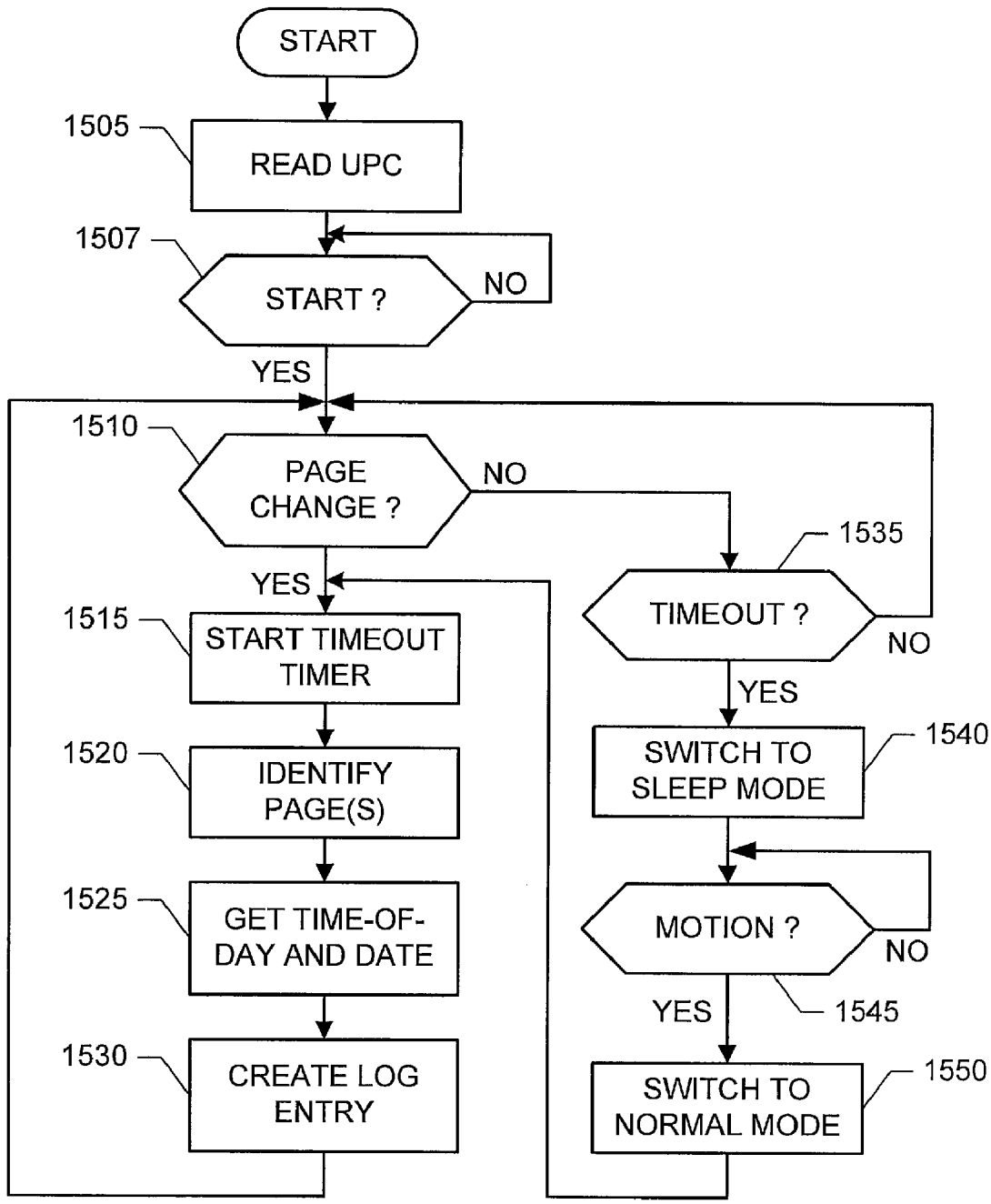
FIG. 15 is a flowchart representative of example machine readable instructions which may be executed to implement the example optical monitoring device of FIG. 3.

FIG. 15 is a flowchart representative of example machine readable instructions that may be executed by a processor (e.g., the processor 1115 of FIG. 11, the processor 1610 of FIG. 16, etc.) to implement the example optical monitoring device 305 of FIG 3. The machine readable instructions of FIG. 15 may be executed by a processor, a controller and/or any other suitable processing device. For example, the machine readable instructions of FIG. 15 may be embodied in coded instructions stored on a tangible medium such as a flash memory, ROM and/or RAM associated with the processor 1610 shown in the example processor platform 1600 and discussed below in conjunction with FIG. 16. Alternatively, some or all of the example machine readable instructions of FIG. 15 and/or the example optical monitoring device 305 of FIG. 3 may be implemented using any of a variety of ASIC(s), PLD(s), FPLD(s), discrete logic, hardware, etc. Also, some or all of the machine readable instructions of FIG. 15 may be implemented manually or any combination of any of the foregoing techniques. Further, although the example machine readable instructions of FIG. 15 are described with reference to the flowchart of FIG. 15, persons of ordinary skill in the art will readily appreciate that many other methods of implementing the example optical monitoring device 305 of FIG. 3 may be employed. For example, the order of execution of the blocks may be changed, and/or some of the blocks described may be changed, eliminated, sub-divided, or combined.

The example machine readable instructions of FIG. 15 begin when the example optical monitoring device 305 of FIG. 3 is positioned and enabled to read the UPC of a printed media (e.g., a magazine). The optical monitoring device 305 reads and logs/records the UPC of the magazine (block 1505) and waits for a respondent 105 to position the optical monitoring device 305 on the top of the spine of the magazine and initiate operation (e.g., by, for example, pressing a button on the optical monitoring device 305, etc.) (block 1507). Alternatively, the optical monitoring device 305 automatically starts processing outputs of the optical sensor 1110 to automatically determine when the optical monitoring device 305 has been positioned. If the optical monitoring device 305 has not yet been positioned (block 1507), the optical monitoring device 305 continues waiting.

If the optical monitoring device 305 has been positioned (block 1507), the optical monitoring device 305 starts processing outputs of the optical sensor 1110 to detect a page change (block 1510). If a page change has occurred (block 1510), the optical monitoring device 305 starts a timeout timer (block 1515), identifies the page number(s) (block 1520), retrieves the current time-of-day and date from the real-time clock 1120 (block 1525), records the page number(s), time-of-day and date in a log stored in the memory 1125 (block 1530), and returns to block 1510 to await another page change.

Returning to block 1510, if a page change has not occurred, the optical monitoring device 305 determines if a timeout has occurred (block 1535). If a timeout has not occurred (block 1535), the optical monitoring device 305 returns to block 1510 to await another page change. If a timeout has occurred (block 1535), the optical monitoring device 305 switches to a low-power-consumption sleep mode to conserve battery power (block 1540). While in the sleep mode, accelerometer 1140 continues monitoring for motion of the optical monitoring device 305 (block 1545). If motion is detected and/or if a user input to wake-up (e.g., toggling of an input) is detected (block 1545), the optical monitoring device 305 switches back to normal operating mode (block 1550) and returns to block 1515 to identify and log the current page(s).

Figure 16:
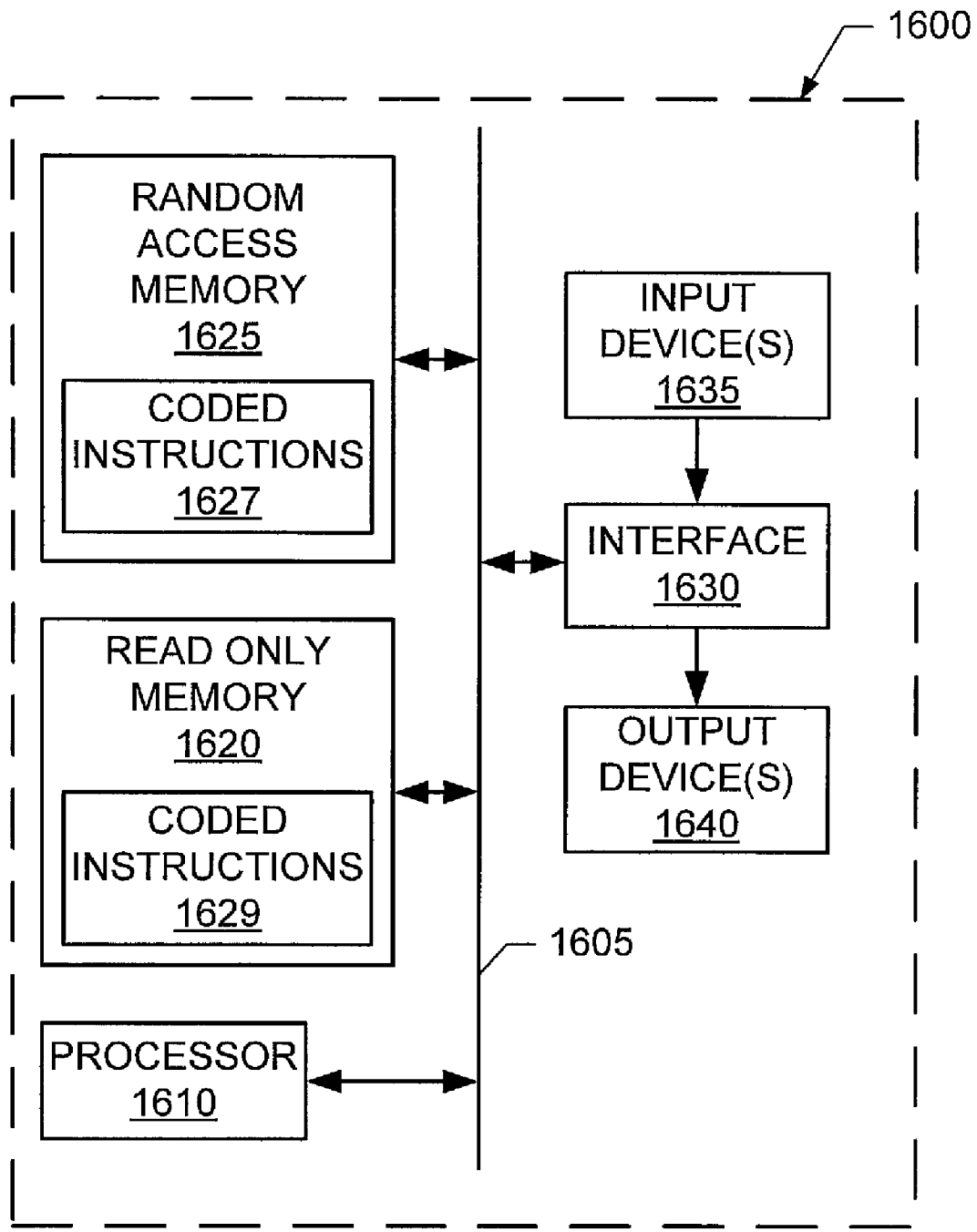
FIG. 16 is a schematic illustration of an example processor platform that may execute the example machine readable instructions represented by FIG. 6 and/or FIG. 15 to implement the example monitoring device of FIGS. 1 and 2 and/or the example optical monitoring device of FIG. 3.

FIG. 16 is a schematic diagram of an example processor platform 1600 capable of executing the example machine readable instructions of FIGS. 6 and 15 to implement the example monitoring device of FIGS. 1, 2 and 4 and/or the example optical monitoring device of FIGS. 3 and 11. For example, the processor platform 1600 can be implemented by one or more general purpose microprocessors, microcontrollers, customized and/or specialized processors, etc.

The processor platform 1600 of the example of FIG. 16 includes a general purpose, customized and/or specialized programmable processor 1610. The processor 1610 executes coded instructions 1627 and/or 1629 present in main memory of the processor 1610 (e.g., within a ROM 1620 and/or a RAM 1625). The processor 1610 may be any type of processing unit, such as a processor from the Intel®, AMD®, IBM®, SUN®, Texas Instruments®, Analog Devices®, etc., families of processors. The processor 1610 may execute, among other things, the example machine readable instructions of FIGS. 6 and 15 to implement some or all of the example monitoring device of FIGS. 1, 2 and 4 and/or the example optical monitoring device of FIGS. 3 and 11.

The processor 1610 is in communication with the main memory (including the ROM 1620 and the RAM 1625) via a bus 1605. The RAM 1625 may be implemented by Synchronous Dynamic Random Access Memory (SDRAM), Dynamic DRAM, and/or any other type of RAM device. The ROM 1620 may be implemented by flash memory and/or any other desired type of memory device. Access to the memory 1620 and 1625 is typically controlled by a memory controller (not shown) in a conventional manner.

The processor platform 1600 also includes a conventional interface circuit 1630. The interface circuit 1630 may be implemented by any type of interface standard, such as an external memory interface, serial port, general purpose input/output, etc.

One or more input devices 1635 and one or more output devices 1640 are connected to the interface circuit 1630. The input devices 1635 and output devices 1640 may be used to implement interfaces between a respondent 105 and/or a download server and the example monitoring device of FIGS. 1, 2 and 4 and/or the example optical monitoring device of FIGS. 3 and 11.

Of course, persons of ordinary skill in the art will recognize that the order, size, and proportions of the memory illustrated in the example systems may vary. Additionally, although this patent discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. For instance, RFID microchips, optical sensors, etc. represent examples of the current state of the art. Such systems are periodically superseded by faster or more efficient devices having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   a first radio frequency identification (RFID) tag to adhere to a first leaflet of a printed media at a first location;
   a second RFID tag to adhere to a second leaflet of the printed media at a second location, the first and second locations being substantially a same location;
   a first RFID absorber to adhere to a third leaflet of the printed media at a third location such that, when the printed media is positioned to expose the first and the third leaflets, the second RFID tag is inactive, and such that, when the printed media is positioned to expose the second and the third leaflets, the first RFID tag is inactive; and
   a third RFID tag to adhere to a fourth leaflet such that the first RFID absorber does not inactivate the third RFID tag.

2. An apparatus as defined in claim 1, further comprising a monitoring device to communicate with the first and the second RFID tags.

3. An apparatus as defined in claim 1, further comprising a second RFID absorber to adhere to a fifth leaflet of the printed media at a fourth location such that when the printed media is positioned to expose the fourth and fifth leaflets, the third RFID tag is active, and such that the second RFID absorber can not inactivate the first and the second RFID tags.

4. An apparatus as defined in claim 1, wherein the first and second RFID tags and the first RFID absorber are to be located within a first zone of the printed media, and the third RFID tag is to be located in a second zone of the printed media.

5. An apparatus as defined in claim 1, wherein the first RFID tag is to adhere to a front of the first leaflet.

6. An apparatus as defined in claim 1, wherein the first RFID absorber is to adhere to a front of the third leaflet.

7. An apparatus as defined in claim 1, wherein the first RFID tag comprises a substantially flat package having a printable top surface and an adhesive bottom surface, the package further comprising:
   an antenna;
   an identifier; and
   an RFID circuit.

8. An apparatus as defined in claim 1, wherein the monitoring device is a removable portion of the printed media.

9. An apparatus as defined in claim 1, wherein the printed media is at least one of a magazine, a book, a journal, a newspaper, a pamphlet, a flyer, or a newsletter.

10. An apparatus comprising:
    a first radio frequency identification (RFID) tag to adhere to a first leaflet of a printed media at a first location;
    a second RFID tag to adhere to a second leaflet of the printed media at a second location, the first and second locations being substantially a same location;
    a first RFID absorber to adhere to a third leaflet of the printed media at a third location such that, when the printed media is positioned to expose the first and the third leaflets, the second RFID tag is inactive, and such that, when the printed media is positioned to expose the second and the third leaflets, the first RFID tag is inactive; and
    a third RFID tag to adhere to the second leaflet of the printed media such that the first RFID absorber can not inactivate the third RFID tag.

11. An apparatus as defined in claim 10, further comprising a second RFID absorber to adhere to a fourth leaflet of the printed media at a fourth location such that, when the printed media is positioned to expose the second and fourth leaflets, the third RFID tag is active, and such that the second RFID absorber does not inactivate the first and the second RFID tags.

12. An apparatus as defined in claim 10, wherein the first and second RFID tags and the first RFID absorber to be are located within a first zone of the printed media, and the third RFID tag is to be located in a second zone of the printed media.

13. An apparatus comprising:
    a first radio frequency identification (RFID) tag to adhere to a first leaflet of a printed media at a first location;
    a second RFID tag to adhere to a second leaflet of the printed media at a second location, the first and second locations being substantially a same location; and
    a first RFID absorber to adhere to a third leaflet of the printed media at a third location such that, when the printed media is positioned to expose the first and the third leaflets, the second RFID tag is inactive, and such that, when the printed media is positioned to expose the second and the third leaflets, the first RFID tag is inactive, wherein the first RFID absorber comprises at least one of a paper label covering conductive ink printed onto the third leaflet, or a metal foil adhered to the third leaflet.

14. A method metering a printed media comprising:
    positioning a first radio frequency identification (RFID) tag on a first leaflet of the printed media, the first RFID tag positioned at a first location on the first leaflet;
    positioning a second RFID tag on a second leaflet of the printed media, the second RFID tag being positioned at a second location on the second leaflet, the first and the second positions being substantially the same location; and
    positioning a first RFID absorber on a third leaflet of the printed media, the first RFID absorber positioned on the third leaflet at a third location such that when the printed media is opened to expose the first and the third leaflets, the second RFID tag is inactive, and such that when the printed media is opened to expose the second and the third leaflets, the first RFID tag is inactive.

15. A method as defined in claim 14, further comprising providing a monitoring device to communicate with at least one of the first or the second RFID tags when it is active to determine a viewing of the printed media.

16. A method as defined in claim 14, further comprising positioning a third RFID tag on to a fourth leaflet of the printed media, the third RFID tag positioned on the fourth leaflet such that the first RFID absorber does not inactivate the third RFID tag.

17. A method as defined in claim 16, further comprising positioning a second RFID absorber on a fifth leaflet of the printed media, the second RFID absorber positioned on the fifth leaflet at a fourth location such that when the printed media is opened to expose the fourth and fifth leaflets, the third RFID tag is active, and such that the second RFID absorber can not inactivate the first and the second RFID tags.

18. A method as defined in claim 14, further comprising positioning a third RFID tag positioned on the second leaflet of the printed media, the third RFID tag positioned on the second leaflet such that the first RFID absorber can not inactivate the third RFID tag.

19. A method as defined in claim 18, further comprising positioning a second RFID absorber on a fourth leaflet of the printed media, the second RFID absorber positioned on the fourth leaflet at a fourth location such that, when the printed media is opened to expose the second and fourth leaflets, the third RFID tag is active, and such that the second RFID absorber does not inactivate the first and the second RFID tags.

20. A method as defined in claim 14, wherein the first RFID tag comprises a substantially flat package having a printable top surface and an adhesive bottom surface, the package further comprising:
    an antenna;
    an identifier; and
    an RFID circuit.

21. A method as defined in claim 14, wherein the first RFID absorber comprises at least one of a paper label covering conductive ink printed onto the third leaflet, or a metal foil adhered to the third leaflet.

22. A method as defined in claim 14, wherein the monitoring device is a removable portion of the printed media.

23. A tangible article of manufacture storing machine readable instructions that, when executed, cause a machine to at least:
    position a first radio frequency identification (RFID) tag on a first leaflet of the printed media, the first RFID tag positioned at a first location on the first leaflet;
    position a second RFID tag on a second leaflet of the printed media, the second RFID tag being positioned at a second location on the second leaflet, the first and the second positions being substantially the same location; and
    position a first RFID absorber on a third leaflet of the printed media, the first RFID absorber positioned on the third leaflet at a third location such that when the printed media is opened to expose the first and the third leaflets, the second RFID tag is inactive, and such that when the printed media is opened to expose the second and the third leaflets, the first RFID tag is inactive.

24. An article of manufacture as defined in claim 23, wherein the machine readable instructions, when executed, cause the machine to position a third RFID tag on a fourth leaflet of the printed media, the third RFID tag positioned on the fourth leaflet such that the first RFID absorber does not inactivate the third RFID tag.

25. An article of manufacture as defined in claim 24, wherein the machine readable instructions, when executed, cause the machine to position a second RFID absorber on a fifth leaflet of the printed media, the second RFID absorber positioned on the fifth leaflet at a fourth location such that when the printed media is opened to expose the fourth and fifth leaflets, the third RFID tag is active, and such that the second RFID absorber can not inactivate the first and the second RFID tags.

26. An article of manufacture as defined in claim 23, wherein the machine readable instructions, when executed, cause the machine to position a third RFID tag positioned on the second leaflet of the printed media, the third RFID tag positioned on the second leaflet such that the first RFID absorber can not inactivate the third RFID tag.

27. An article of manufacture as defined in claim 26, wherein the machine readable instructions, when executed, cause the machine to position a second RFID absorber on a fourth leaflet of the printed media, the second RFID absorber positioned on the fourth leaflet at a fourth location such that, when the printed media is opened to expose the second and fourth leaflets, the third RFID tag is active, and such that the second RFID absorber does not inactivate the first and the second RFID tags.

28. An article of manufacture as defined in claim 23, wherein the first RFID tag comprises a substantially flat package having a printable top surface and an adhesive bottom surface, the package further comprising:
    an antenna;
    an identifier; and
    an RFID circuit.

29. An article of manufacture as defined in claim 23, wherein the first RFID absorber comprises at least one of a paper label covering conductive ink printed onto the third leaflet, or a metal foil adhered to the third leaflet.

30. An article of manufacture as defined in claim 23, wherein the monitoring device is a removable portion of the printed media.

31. An apparatus comprising:
    a tag to affix to a first leaflet of a printed media; and
    a monitoring device to place within the printed media, the monitoring device communicatively coupled to the tag, wherein the monitoring device is to affix to a removable portion of the printed media, the removable portion is defined by a perforation, and the removable portion comprises a card.

32. An apparatus as defined in claim 31, wherein the monitoring device is communicatively coupled to the tag via a conductive trace printed on the printed media.

33. An apparatus as defined in claim 31, wherein the card is printed with a mailing address and pre-paid postage.

34. An apparatus as defined in claim 31, wherein the tag is a radio frequency identification (RFID) device.

35. An apparatus as defined in claim 34, further comprising an RFID absorber to adhere to a second leaflet of the printed media to inhibit an operation of the RFID tag when the second leaflet overlaps the first leaflet.

36. An apparatus as defined in claim 34, wherein the RFID tag comprises a substantially flat package having a printable top surface and an adhesive bottom surface, the package further comprising:
    an antenna;
    an identification; and
    an RFID circuit.

37. An apparatus as defined in claim 31, further comprising an absorber to affix to a second leaflet of the printed media, the absorber to inhibit operation of the tag when the second leaflet overlaps the first leaflet.

38. An apparatus as defined in claim 31, wherein the printed media is at least one of a magazine, a book, a journal, a newspaper, a pamphlet, a flyer, or a newsletter.

39. An apparatus comprising:
a tag to affix to a first leaflet of a printed media; and
a monitoring device to place within the printed media, the media device communicatively coupled to the tag, wherein the tag is a radio frequency identification (RFID) tag and the RFID tag further includes a light sensitive device to enable operation of the RFID tag when the RFID tag is exposed to a light source.

40. An apparatus comprising:
a tag to affix to a first leaflet of a printed media; and
a monitoring device to place within the printed media, the monitoring device communicatively coupled to the tag, wherein the tag comprises:
a circuit to communicate with the monitoring device; and
a substantially flat package having a printable top surface and an adhesive bottom surface, the adhesive bottom surface to connect an interface of the circuit to the conductive trace.

41. An apparatus as defined in claim 40, wherein the tag further includes a light sensitive device to enable operation of the circuit when the tag is exposed to a light source.

42. A method of metering a printed media comprising:
adhering a tag to a first leaflet of the printed media; and
placing a removable monitoring device within the printed media to communicate with the tag, wherein the monitoring device is affixed to a removable portion of the printed media and the removable portion is printed with a mailing address and pre-paid postage.

43. A method as defined in claim 42, further comprising printing a conductive trace on the printed media to communicatively couple the monitoring device to the tag.

44. A method as defined in claim 42, wherein the tag is a radio frequency identification (RFID) device.

45. A method as defined in claim 44, further comprising affixing an RFID absorber to a second leaflet of the printed media to inhibit an operation of the RFID tag when the second leaflet overlaps the first leaflet.

46. A method as defined in claim 44, wherein the RFID tag comprises a substantially flat package having a printable top surface, the package further comprising:
an antenna;
an identifier; and
an RFID circuit.

47. A method as defined in claim 42, further comprising adhering an absorber to a second leaflet of the printed media, the absorber to inhibit an operation of the tag when the second leaflet overlaps the first leaflet.

48. A method of metering a printed media comprising:
adhering a tag to a first leaflet of the printed media; and
placing a removable monitoring device within the printed media to communicate with the tag, wherein the monitoring device is affixed to a removable portion of the printed media, the removable portion is defined by a perforation, and the removable portion comprises a card.

49. A method as defined in claim 48, wherein the removable portion is printed with a mailing address and pre-paid postage.

50. A method of metering a printed media comprising:
adhering a tag to a first leaflet of the printed media; and
placing a removable monitoring device within the printed media to communicate with the tag, wherein the tag is a radio frequency identification (RFID) tag, the RFID tag comprises a substantially flat package having a printable top surface, the package further comprising:
an antenna;
an identifier; and
an RFID circuit; and
the RFID tag further comprises a light sensitive device to enable an operation of the RFID circuit when the RFID tag is exposed to a light source.

51. A method of metering a printed media comprising:
adhering a tag to a first leaflet of the printed media; and
placing a removable monitoring device within the printed media to communicate with the tag, wherein the tag comprises:
a circuit to communicate with the monitoring device; and
a substantially flat package having a printable top surface and an adhesive bottom surface, the adhesive bottom surface to connect an interface of the circuit to the conductive trace.

52. A method as defined in claim 51, wherein the tag further includes a light sensitive device to enable operation of the circuit when the tag is exposed to a light source.

53. A tangible article of manufacture storing machine readable instructions that, when executed, cause a machine to at least:
adhere a tag to a first leaflet of the printed media; and
place a removable monitoring device within the printed media to communicate with the tag, wherein the machine readable instructions, when executed, cause the machine to print on the card a mailing address and pre-paid postage.

54. An article of manufacture as defined in claim 53, wherein the machine readable instructions, when executed, cause the machine to print a conductive trace on the printed media to communicatively couple the monitoring device to the tag.

55. An article of manufacture as defined in claim 53, wherein the tag is a radio frequency identification (RFID) device.

56. An article of manufacture as defined in claim 55, wherein the machine readable instructions, when executed, cause the machine to affix an RFID absorber to a second leaflet of the printed media to inhibit operation of the RFID tag when the second leaflet overlaps the first leaflet.

57. An article of manufacture as defined in claim 55, wherein the RFID tag comprises a substantially flat package having a printable top surface, the package further comprising:
an antenna;
an identifier; and
an RFID circuit.

58. An article of manufacture as defined in claim 57, wherein the RFID tag further comprises a light sensitive device to enable an operation of the RFID circuit when the RFID tag is exposed to a light source.

59. An article of manufacture as defined in claim 53, wherein the machine readable instructions, when executed, cause the machine to adhere an absorber to a second leaflet of the printed media, the absorber to inhibit an operation of the tag when the second leaflet overlaps the first leaflet.

60. A tangible article of manufacture storing machine readable instructions that, when executed, cause a machine to at least:
adhere a tag to a first leaflet of the printed media; and
place a removable monitoring device within the printed media to communicate with the tag, wherein the machine readable instructions, when executed, cause the machine to affix the monitoring device to a removable portion of the printed media and to define the removable portion by a perforation, and wherein the removable portion comprises a card.

61. A tangible article of manufacture storing machine readable instructions that, when executed, cause a machine to at least:
  adhere a tag to a first leaflet of the printed media; and
  place a removable monitoring device within the printed media to communicate with the tag, wherein the tag comprises:
  a circuit to communicate with the monitoring device; and
  a substantially flat package having a printable top surface and an adhesive bottom surface, the adhesive bottom surface to connect an interface of the circuit to the conductive trace.

62. An article of manufacture as defined in claim 61, wherein the tag further includes a light sensitive device to enable operation of the circuit when the tag is exposed to a light source.

63. For use with a printed media, an optical monitoring device comprising:
  an optical sensor to record viewing of a page of the printed media;
  a mechanical fastener to removeably secure the optical sensor to the printed media; and
  an accelerometer to detect when the printed media is being viewed.

64. For use with a printed media, an optical monitoring device comprising:
  an optical sensor to record viewing of a page of the printed media; and
  a mechanical fastener to removeably secure the optical sensor to the printed media, wherein the mechanical fastener attaches to at least one of a spine or binding of the printed media.

65. For use with a printed media, an optical monitoring device comprising:
  an optical sensor to record viewing of a page of the printed media; and
  a mechanical fastener to removeably secure the optical sensor to the printed media, wherein the mechanical fastener comprises at least one of forks or clips.

66. An optical monitoring device as defined in claim 65, wherein the at least one of the forks or clips are adjustable to accommodate a thickness of the printed media.

67. For use with a printed media, an optical monitoring device comprising:
  an optical sensor to record viewing of a page of the printed media; and
  a mechanical fastener to removeably secure the optical sensor to the printed media, further comprising:
  a lens to focus reflected ambient light onto the optical sensor; and
  a processor to identify a largest gap between two leaflets and to determine a count of a number of leaflets to a side of the identified gap.

68. An optical monitoring device as defined in claim 67, further comprising:
  a clock to determine a time associated with the count;
  a memory to store the count and the time; and
  a battery.

69. For use with a printed media, an optical monitoring device comprising:
  an optical sensor to record viewing of a page of the printed media; and
  a mechanical fastener to removeably secure the optical sensor to the printed media, wherein the optical sensor is positioned to read a universal product code (UPC) for the printed media.

70. A method of metering a printed media comprising:
  capturing an image of an edge of the printed media; and
  identifying a viewed page based on the image, wherein identifying the viewed page comprises:
  determining a largest gap; and
  counting a number of leaflets to a side of the largest gap.

71. A method as defined in claim 70, wherein the edge of the printed media is a top edge of the printed media.

72. A method of metering a printed media comprising:
  capturing an image of an edge of the printed media; and
  identifying a viewed page based on the image;
  determining a time associated with presentation of the image; and
  storing the identification of the viewed page and the time in a log.

73. A method of metering a printed media comprising:
  capturing an image of an edge of the printed media; and
  identifying a viewed page based on the image;
  reading a universal product code (UPC) from the printed media; and
  storing the UPC in a log.

74. A method of metering a printed media comprising:
  capturing an image of an edge of the printed media; and
  identifying a viewed page based on the image;
  determining a start of motion of the printed media; and
  wherein capturing the image and identifying the viewed page occurs in response to determining the start of motion.

75. A tangible article of manufacture storing machine readable instructions that, when executed, cause a machine to at least:
  determine a start of motion of a printed media;
  capture an image of an edge of the printed media; and
  identify a viewed page based on the image.

76. An article of manufacture as defined in claim 75, wherein the edge of the printed media is a top edge of the printed media.

77. A tangible article of manufacture storing machine readable instructions that, when executed, cause a machine to at least:
  capture an image of an edge of a printed media;
  identify a viewed page based on the image by:
  determining a largest gap; and
  counting a number of leaflets to a side of the largest gap.

78. A tangible article of manufacture storing machine readable instructions that, when executed, cause a machine to at least:
  capture an image of an edge of a printed media;
  identify a viewed page based on the image;
  determine a time associated with presentation of the image; and
  store the identification of the viewed page and the time in a log.

79. A tangible article of manufacture storing machine readable instructions that, when executed, cause a machine to at least:
  capture an image of an edge of a printed media;
  identify a viewed page based on the image;
  read a universal product code (UPC) from the printed media; and
  store the UPC in a log.

* * * * *